(12) United States Patent
Halmos et al.

(10) Patent No.: US 10,725,156 B2
(45) Date of Patent: Jul. 28, 2020

(54) LADAR SYSTEM SUPPORTING DOUBLET WAVEFORM FOR SEQUENTIAL IN-PHASE (I) AND QUADRATURE (Q) PROCESSING

(71) Applicant: Raytheon Company, Waltham, MA (US)

(72) Inventors: Maurice J. Halmos, Encino, CA (US); Joseph Marron, Manhattan Beach, CA (US); Jae H. Kyung, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 293 days.

(21) Appl. No.: 15/698,381

(22) Filed: Sep. 7, 2017

(65) Prior Publication Data

US 2019/0072651 A1   Mar. 7, 2019

(51) Int. Cl.
| | |
|---|---|
| *G01C 3/08* | (2006.01) |
| *G01S 7/4865* | (2020.01) |
| *G01S 7/481* | (2006.01) |
| *G01S 17/58* | (2006.01) |
| *G01S 17/10* | (2020.01) |
| *G01S 7/4861* | (2020.01) |
| *G01S 7/484* | (2006.01) |

(Continued)

(52) U.S. Cl.
CPC ............ *G01S 7/4865* (2013.01); *G01S 7/484* (2013.01); *G01S 7/487* (2013.01); *G01S 7/4808* (2013.01); *G01S 7/4811* (2013.01); *G01S 7/4814* (2013.01); *G01S 7/4816* (2013.01); *G01S 7/4861* (2013.01); *G01S 17/10* (2013.01); *G01S 17/58* (2013.01)

(58) Field of Classification Search
None
See application file for complete search history.

(56) References Cited

U.S. PATENT DOCUMENTS

| | | | |
|---|---|---|---|
| 5,093,563 | A | 3/1992 | Small et al. |
| 5,418,158 | A | 5/1995 | Larsen |
| 5,428,361 | A | 6/1995 | Hightower et al. |

(Continued)

FOREIGN PATENT DOCUMENTS

WO   2005080928 A1   9/2005

OTHER PUBLICATIONS

Qing Xu; Arturo Arvizu Mondragon; Philippe Gallion; Francisco J. Mendieta Homodyne In-Phase and Quadrature Detection of Weak Coherent States With Carrier Phase Tracking (Year: 2009).*

(Continued)

*Primary Examiner* — Isam A Alsomiri
*Assistant Examiner* — Amir J Askarian

(57) ABSTRACT

A method includes generating a first optical signal containing doublet pulses. Each doublet pulse includes a first pulse and a second pulse. The second pulses of the doublet pulses are in quadrature with the first pulses of the doublet pulses. The method also includes transmitting the first optical signal towards a target and receiving a second optical signal containing reflected doublet pulses from the target. Each reflected doublet pulse includes a first reflected pulse and a second reflected pulse. The method further includes performing in-phase and quadrature processing of the first and second reflected pulses and identifying one or more parameters of the target based on the in-phase and quadrature processing.

20 Claims, 7 Drawing Sheets

(51) Int. Cl.
*G01S 7/487* (2006.01)
*G01S 7/48* (2006.01)

(56) References Cited

U.S. PATENT DOCUMENTS

| | | | |
|---|---|---|---|
| 5,751,830 | A | 5/1998 | Hutchinson |
| 5,815,250 | A | 9/1998 | Thomson et al. |
| 7,272,271 | B2 | 9/2007 | Kaplan et al. |
| 7,342,651 | B1 * | 3/2008 | Woolfson ............... G01S 7/484 356/28 |
| 7,741,990 | B2 | 6/2010 | Aprile |
| 8,406,275 | B2 | 3/2013 | Sforza |
| 8,599,062 | B2 | 12/2013 | Szajnowski |
| 2003/0076485 | A1 | 4/2003 | Ruff et al. |
| 2006/0227317 | A1 | 10/2006 | Henderson et al. |
| 2010/0021179 | A1 * | 1/2010 | Kikuchi ............... H04B 10/61 398/183 |
| 2013/0050676 | A1 | 2/2013 | d'Aligny |
| 2019/0011558 | A1 * | 1/2019 | Crouch ............... G01S 17/102 |

OTHER PUBLICATIONS

Michael Cerna and Audrey F. Harvey The Fundamentals of FFT-Based Signal Analysis and Measurement (Year: 2000).*

Josep M. Fabrega and Josep Prat Homodyne receiver prototype with time-switching phase diversity and feedforward analog processing (Year: 2007).*

Mariluce Gongalves Fonseca "Spin Echo Magnetic Resonance Imaging" (Year: 2013).*

David Press,1 Kristiaan De Greve,1 Peter L. McMahon,1 Thaddeus D. Ladd,1, 2, * Benedikt Friess,1, 3 Christian Schneider,3 Martin Kamp,3 Sven Hofling,3 Alfred Forchel,3 and Yoshihisa Yamamoto "Ultrafast Optical Spin Echo in a Single Quantum Dot" (Year: 2010).*

B.Buijsse and J. Schmidt "Electron spin-echo-detected excitation spectroscopy of manganese-doped Ba3(VO4)2: Identi6cation of tetrahedral Mn'+ as the active laser center" (Year: 1995).*

Li; "Time-of-Flight Camera—An Introduction"; Texas Instruments Technical White Paper; SLOA190B; Jan. 2014; revised May 2014; 10 pages.

Niclass, et al. "Single-Photon Synchronous Detection"; IEEE Journal of Solid-State Circuits; vol. 44, No. 7; Jul. 2009; 13 pages.

Marron et al.; "Atmospheric turbulence correction using digital holographic detection: experimental results"; Optics Express, vol. 17, No. 14; Jul. 6, 2009; pp. 11638-11651.

Notification of Transmittal of the International Search Report and the Written Opinion of the International Searching Authority, or the Declaration dated Jun. 9, 2016, in connection with International Patent Application No. PCT/US2016/019088; 14 pages.

Marron et al., "Coherent Detection with an Asynchronous Geiger Mode Array", Applications of Lasers for Sensing and Free Space Communications 2015, Arlington, Virginia, Jun. 7-11, 2015, 3 pages.

International Search Report and Written Opinion of the International Search Authority for International Patent Application No. PCT/US2018/029418 dated Jul. 30, 2018, 12 pages.

* cited by examiner

LADAR SYSTEM SUPPORTING DOUBLET WAVEFORM FOR SEQUENTIAL IN-PHASE (I) AND QUADRATURE (Q) PROCESSING

TECHNICAL FIELD

This disclosure generally relates to laser radar (LADAR) systems. More specifically, this disclosure relates to a LADAR system supporting a doublet waveform for sequential in-phase (I) and quadrature (Q) processing.

BACKGROUND

A laser radar (LADAR) system can be used to illuminate one or more objects using pulsed laser light, and reflected pulses from the objects can be received and analyzed to identify information about the objects. For example, a LADAR system could be used to illuminate a moving object in order to determine a range to the object and a Doppler velocity of the object. In this way, the LADAR system could be used to identify the distance to the object and the speed of the object.

Conventional LADAR systems often include photon counters used to detect reflected laser pulses from objects. A synchronous framed receiver can be repeatedly activated to count photons during a very brief time window in which a reflected pulse is expected to be received. This typically imposes very narrow spectral windows from which to extract reflected laser pulses. Any data corruption that occurs within such small windows can therefore have significant impacts on the operation of the receiver.

SUMMARY

This disclosure provides a laser radar (LADAR) system supporting a doublet waveform for sequential in-phase (I) and quadrature (Q) processing.

In a first embodiment, a method includes generating a first optical signal containing doublet pulses. Each doublet pulse includes a first pulse and a second pulse. The second pulses of the doublet pulses are in quadrature with the first pulses of the doublet pulses. The method also includes transmitting the first optical signal towards a target and receiving a second optical signal containing reflected doublet pulses from the target. Each reflected doublet pulse includes a first reflected pulse and a second reflected pulse. The method further includes performing in-phase and quadrature processing of the first and second reflected pulses and identifying one or more parameters of the target based on the in-phase and quadrature processing.

In a second embodiment, a system includes a transmitter configured to generate a first optical signal containing doublet pulses and to transmit the first optical signal. Each doublet pulse includes a first pulse and a second pulse. The second pulses of the doublet pulses are in quadrature with the first pulses of the doublet pulses. The system also includes a receiver configured to (i) receive a second optical signal containing reflected doublet pulses from a target, each reflected doublet pulse comprising a first reflected pulse and a second reflected pulse, (ii) perform in-phase and quadrature processing of the first and second reflected pulses, and (iii) identify one or more parameters of the target based on the in-phase and quadrature processing.

In a third embodiment, a non-transitory computer readable medium contains instructions that when executed cause a signal processor, after a first optical signal containing doublet pulses is transmitted towards a target, to identify reflected doublet pulses contained in a second optical signal received from the target. Each doublet pulse includes a first pulse and a second pulse. The second pulses of the doublet pulses are in quadrature with the first pulses of the doublet pulses. Each reflected doublet pulse includes a first reflected pulse and a second reflected pulse. The medium also contains instructions that when executed cause the signal processor perform in-phase and quadrature processing of the first and second reflected pulses and identify one or more parameters of the target based on the in-phase and quadrature processing.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
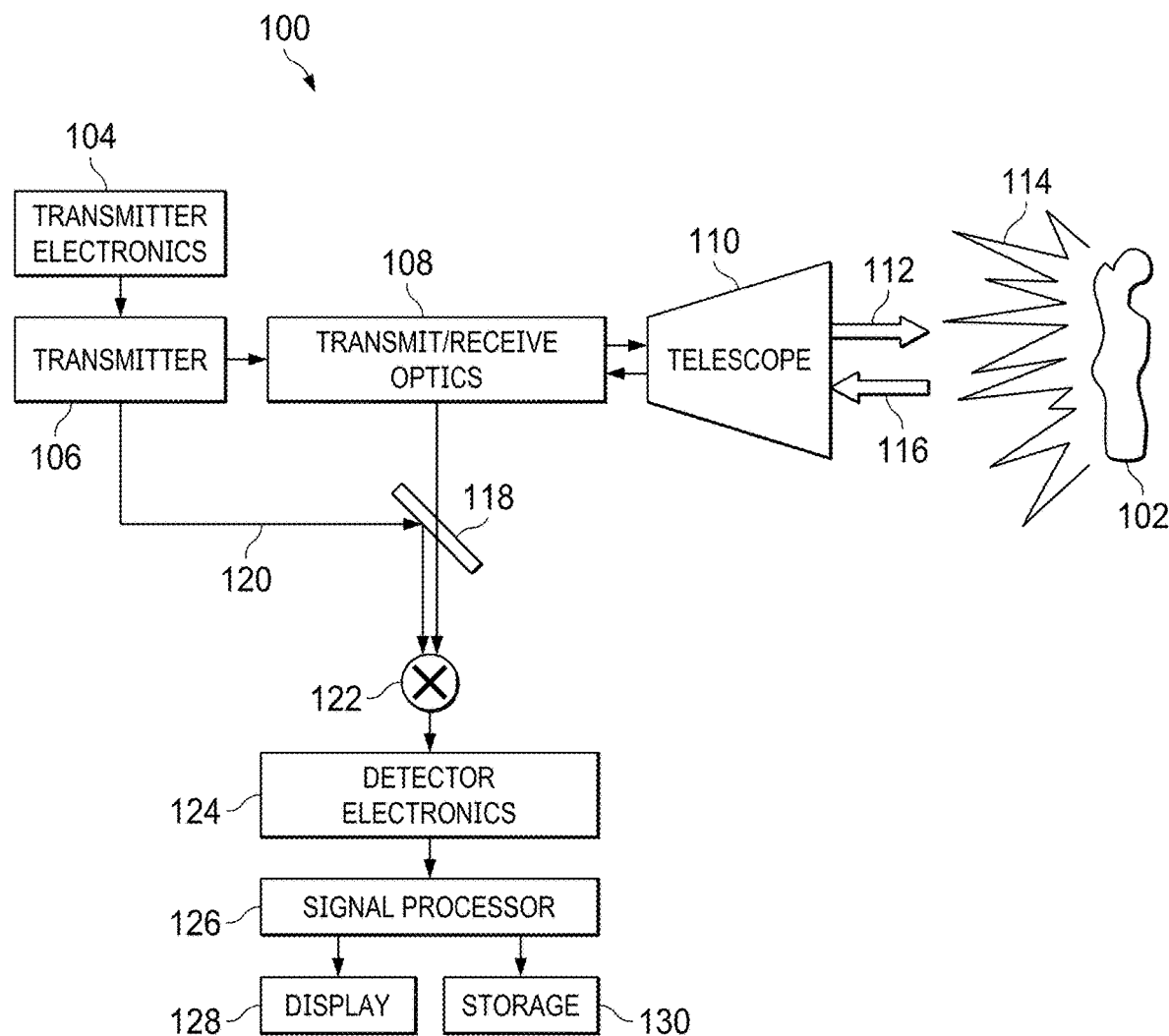
FIG. 1 illustrates an example laser radar (LADAR) system according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, conventional laser radar (LADAR) systems typically include photon counters that are used to identify reflected laser pulses in very narrow windows. Any data corruption that occurs within these narrow windows can have significant impacts on the operation of the LADAR system. One common cause of data corruption involves conjugate or negative frequency aliasing, which refers to corruption caused when a signal of interest and its conjugate become aliased.

Some coherent LADAR systems use receivers that have a very high effective sampling rate in order to cover all a priori Doppler uncertainty within the Nyquist ambiguity. Stated another way, since the Doppler velocity of an object is unknown until it is measured, coherent LADAR systems can support very high sampling rates in order to account for the uncertainty of the object's Doppler velocity. While effective, this approach requires a large Nyquist spectrum in order to avoid aliasing problems, and very high sampling rates or a large Nyquist spectrum may not be possible or desirable in some applications.

In conventional radar systems where the sampling rate is typically low, signal corruption caused by aliasing can be reduced or prevented by processing a received signal in two parallel paths. The received signal in an in-phase (I) path is processed using a reference signal from an electronic local oscillator (LO), and the received signal in a quadrature (Q) path is processed using an LO signal that has been shifted in phase by 90° compared to the reference signal. The processed signals from both paths are then combined to create a final output. This approach is effective and often straightforward to implement in the electrical domain. Unfortunately, such an approach in a LADAR system would effectively double the optical receiver hardware, which significantly increases the size, weight, cost, and power of the LADAR system.

In accordance with this disclosure, a LADAR system includes a single optical receiver, and a transmitted waveform is modified to support sequential I and Q processing. A LADAR waveform denotes a pattern of pulses that a LADAR system generates and transmits, and a similar waveform is received after reflection of the transmitted waveform from an object. The specific waveform that is used can affect the ability of the LADAR system to detect targets and simultaneously measure parameters of interest (such as range and Doppler velocity) with an acceptable fidelity. Rather than transmitting a waveform and simultaneously processing received pulses in parallel I and Q paths, this disclosure describes a LADAR system that "doubles" the pulses in a single transmitted waveform. For each original pulse in the original waveform, another pulse is added to the waveform shortly after the original pulse. As a result, each original pulse in the waveform is replaced by a "doublet" pulse, which represents a pair of pulses in the waveform. After reflection from an object and receipt by the LADAR system, the first pulse of each pair can be subjected to in-phase processing, and the second pulse of each pair can be subjected to quadrature processing (or vice versa). As a result, the I and Q processing occurs sequentially using different pulses, rather than occurring simultaneously in parallel paths using the same pulses.

In this way, I and Q processing occurs sequentially using a single receiver. This avoids the use of two receivers and reduces the size, weight, cost, and power of the LADAR system. In LADAR receivers that are implemented using detector arrays, this can greatly simplify the hardware requirements for the LADAR receivers. Note that there may be very small phase errors between sequential pulses, which could be caused by movement of the object that is reflecting the pulses or by movement of the LADAR receiver. Because of this, the results obtained using this approach may not be identical to the results obtained using simultaneous I and Q processing of each pulse in parallel paths. There will be a limit on the frequency or number of Nyquist lanes that the transmitted laser pulses can use before the conjugate spectrum is not cancelled adequately and aliasing corruption occurs. However, the results obtained here are still suitably accurate for a large number of applications.

FIG. 1 illustrates an example LADAR system 100 according to this disclosure. As shown in FIG. 1, the system 100 is used to detect one or more targets 102 and one or more parameters associated with each of the targets 102. In this example, the target 102 is a randomly-shaped object, although this is for illustration only. Any suitable target or targets 102 could be detected by the system 100. Example targets 102 that could be detected by the system 100 include drones or other aerial vehicles, trucks or other ground-based vehicles, or other objects of interest. The system 100 could also be used to identify any suitable parameter or parameters of interest related to the target(s) 102. Example parameters that could be detected by the system 100 include range (distance) and Doppler velocity (speed) of each target 102.

The LADAR system 100 here includes transmitter electronics 104 and a transmitter 106. The transmitter electronics 104 generally operate to generate an electrical signal, and the transmitter 106 generally operates to convert the electrical signal into an optical signal. For example, the transmitter electronics 104 could include electrical components that generate an electrical signal having a desired waveform (including doublet pulses), and the transmitter 106 could generate a laser signal having the same waveform. The transmitter electronics 104 include any suitable structure for controlling operation of a transmitter. The transmitter 106 includes any suitable structure for generating a laser signal or other optical signal containing pulses.

The optical signal from the transmitter 106 is provided via transmit/receive optics 108 to a telescope 110. The transmit/receive optics 108 function as a transmit/receive switch and allow both outgoing and incoming optical signals to pass through the telescope 110. The transmit/receive optics 108 include any suitable optical device or devices for facilitating both transmission and reception of optical signals through a telescope or other common structure.

The telescope 110 generally operates to direct an outgoing optical signal 112 towards one or more targets 102. The optical signal 112 denotes the optical signal generated by the transmitter 106 and includes a number of pulses, including doublet pulses, in a LADAR waveform. The transmission of the optical signal 112 towards the target 102 results in reflected laser light 114 that can travel in various directions from the target 102. At least some of the reflected laser light 114 travels back to the telescope 110 as an optical signal 116. The telescope 110 can therefore be used to direct laser pulses toward a target 102 of interest and to receive reflected laser pulses from the target 102. The telescope 110 could include focusing optics or other optical devices to facilitate the directing of pulses towards one or more targets 102 and the receipt of reflected pulses from the target(s) 102. The telescope 110 includes any suitable structure for directing and receiving optical signals.

The reflected optical signal 116 received by the telescope 110 is directed through the transmit/receive optics 108 to a LADAR receiver that processes the reflected optical signal 116. In this example, the reflected optical signal 116 is directed to a dichroic mirror 118. The dichroic mirror 118 allows the optical signal 116 to pass while reflecting an optical signal 120 from the transmitter 106. As described below, the optical signal 120 could denote a signal that is based on a master local oscillator laser source or other source in the transmitter 106.

A mixer 122 mixes the optical signals 116 and 120 and generates an output, which is based on both optical signals 116 and 120. For example, the output of the mixer 122 could include pulses contained in the optical signal 116 that were received within longer pulses contained in the optical signal 120. Detector electronics 124 use the output of the mixer 122 to identify pulses in the optical signal 116. The identified pulses are analyzed by a signal processor 126, which can use the pulses to detect the target 102 and one or more parameters of the target 102 (such as range and Doppler velocity).

The mixer 122 includes any suitable structure for mixing optical signals. The detector electronics 124 include any suitable structure for detecting optical signals, such as a Geiger Mode Avalanche Photo Diodes (GMAPD) detector array. The signal processor 126 includes any suitable structure for analyzing signals, such as a microprocessor, microcontroller, digital signal processor (DSP), field programmable gate array (FPGA), application specific integrated circuit (ASIC), or discrete logic devices. In some embodiments, the signal processor 126 could execute software instructions for detecting and analyzing pulses as described below.

The outputs of the signal processor 126 could be used in any suitable manner. In this example, the outputs of the signal processor 126 can be presented on a display device 128 (such as a monitor) or stored on a storage device 130 (such as a RAM, ROM, Flash memory, hard drive, or optical disc). Note, however, that the outputs of the signal processor 126 could be used in any other suitable manner and could be provided to any other suitable devices or systems.

Although FIG. 1 illustrates one example of a LADAR system 100, various changes may be made to FIG. 1. For example, the system 100 in FIG. 1 is shown in simplified form to facilitate an easier understanding of this disclosure. LADAR systems can include a number of additional components that perform a wide variety of functions.

Figure 2:
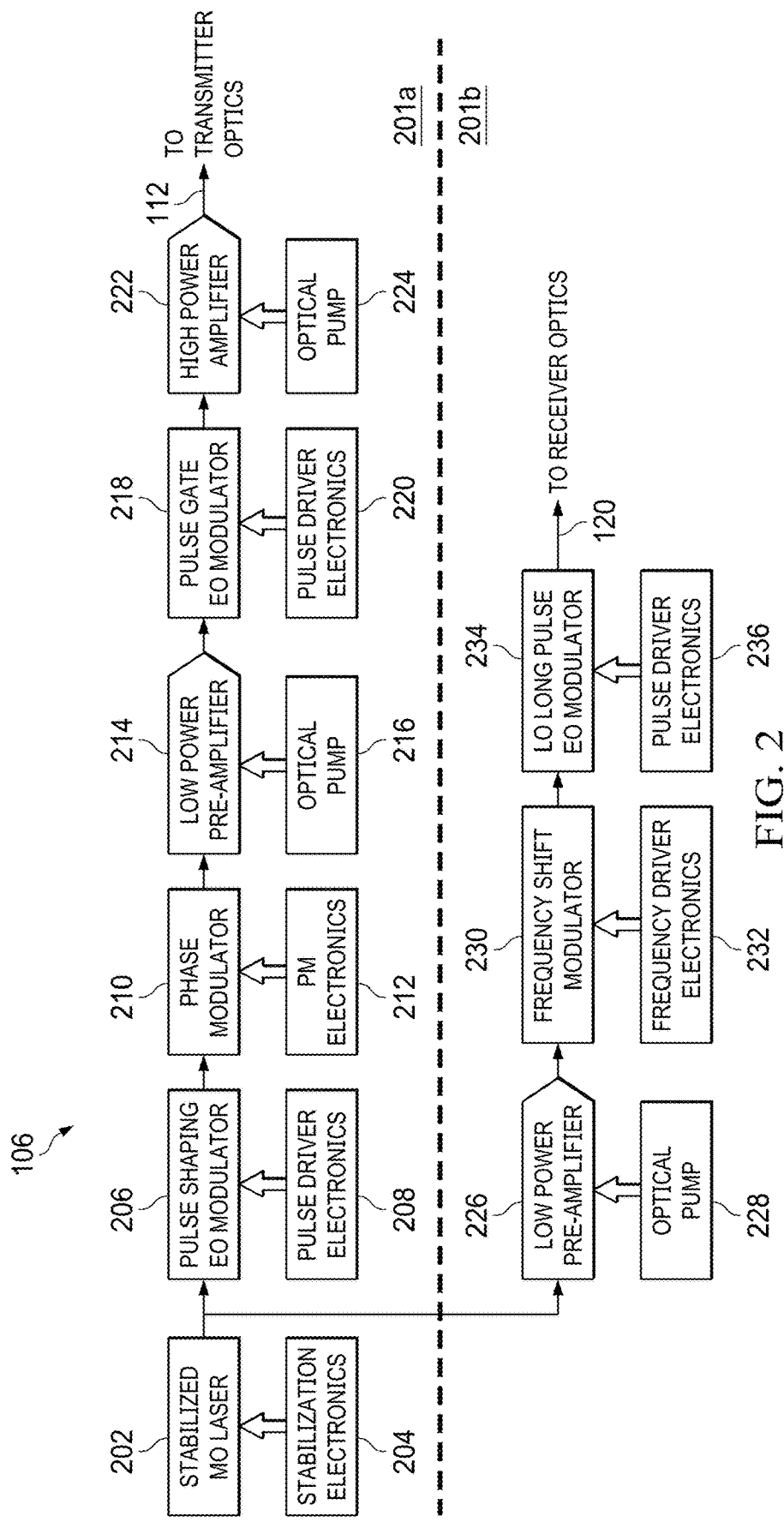
FIG. 2 illustrates an example transmitter in a LADAR system according to this disclosure.

FIG. 2 illustrates an example transmitter 106 in a LADAR system 100 according to this disclosure. Note that various components in FIG. 2 may alternatively reside within or be used as part of the transmitter electronics 104. In FIG. 2, the transmitter 106 is generally divided into two sections, namely a transmitter leg 201a and a local oscillator leg 201b. The transmitter leg 201a is used to generate the optical signal 112 that is transmitted towards at least one target 102. The local oscillator leg 201b is used to generate the optical signal 120, which is used to analyze the reflected optical signal 116.

As shown in FIG. 2, the transmitter leg 201a of the transmitter 106 includes a stabilized master oscillator (MO) laser source 202 and stabilization electronics 204. The laser source 202 generates a stabilized optical signal, which can be modified by other components of the transmitter 106 to create the pulsed optical signal 112. For example, the laser source 202 could generate a continuous wave (CW) optical signal at any suitable frequency or frequencies. The operation of the laser source 202 can be adjusted by the stabilization electronics 204 so that an output of the laser source 202 is substantially constant. For instance, the stabilization electronics 204 could adjust the operation of the laser source 202 to account for temperature or other operational differences. The laser source 202 includes any suitable structure for generating optical signals. The stabilization electronics 204 include any suitable structure for adjusting a laser source.

A pulse shaping electro-optical (EO) modulator 206 receives a portion of the output from the laser source 202 and modulates that portion of the output to create an optical signal containing doublet pulses. For example, the EO modulator 206 could modulate the CW output from the laser source 202 to generate an optical signal containing pairs of pulses, where the pulses in each pair are very close together. Any suitable electro-optical modulation technique could be used here to generate an output having doublet pulses. Also, any suitable pulses can be generated by the EO modulator 206, such as pulses of approximately 0.5 ns to approximately 3.0 ns in duration (which can vary depending on the application). Pulse driver electronics 208 control the operation of the EO modulator 206 to thereby control the generation of the doublet pulses. For instance, the pulse driver electronics 208 could control when the EO modulator 206 is operating and how optical pulses are generated by the EO modulator 206. The EO modulator 206 includes any suitable structure for modulating optical signals. The pulse driver electronics 208 include any suitable structure for controlling electro-optical modulation of optical signals.

A phase modulator 210 receives the output from the EO modulator 206 and modulates the pulses of each doublet so that the pulses have different phase shifts. For example, the phase modulator 210 could modulate sequential pulses with an alternating phase shift of 90°. After reflection from a target 102, this allows a train of pulses received by a single receiver to be separated into two signals (one signal shifted by 90° from the other signal). Phase modulator electronics 212 control the operation of the phase modulator 210 to thereby control the modulation of the doublet pulses. For example, the phase modulator electronics 212 could control when the phase modulator 210 is operating and how the phase modulator 210 is modulating an optical signal. The phase modulator 210 includes any suitable structure for modulating the phase of optical signals. The phase modulator electronics 212 include any suitable structure for controlling phase modulation of optical signals.

A low-power preamplifier 214 amplifies the output of the phase modulator 210. An optical pump 216 provides the optical energy for this amplification. The low-power preamplifier 214 includes any suitable structure for amplifying optical signals, such as a fiber amplifier. The optical pump 216 includes any suitable structure for providing optical energy used for amplification, such as one or more laser pump diodes.

A pulse gate EO modulator 218 receives the amplified output from the low-power preamplifier 214 and modulates the amplified output to allow the pulses in the optical signal to pass while reducing or blocking amplified spontaneous emissions (ASE) created by the preamplifier 214. Any suitable electro-optical modulation could be used here to reduce or block ASE while allowing the desired pulses to pass. Pulse driver electronics 220 control the operation of the pulse gate EO modulator 218. For instance, the pulse driver electronics 220 could control when the pulse gate EO modulator 218 is operating and control the timing of the pulse gate EO modulator 218. The pulse gate EO modulator 218 includes any suitable structure for modulating optical signals. The pulse driver electronics 220 include any suitable structure for controlling electro-optical modulation of optical signals.

A high-power amplifier 222 amplifies the output of the pulse gate EO modulator 218 to generate a high-power optical signal containing doublet pulses, which can be transmitted towards at least one target 102 as the optical signal 112. An optical pump 224 provides the optical energy for this amplification. The high-power amplifier 222 includes any suitable structure for amplifying optical signals, such as a fiber amplifier or a planar waveguide. The optical pump 224 includes any suitable structure for providing optical energy used for amplification, such as one or more laser pump diodes.

As shown in FIG. 2, the local oscillator leg 201b of the transmitter 106 includes a low-power preamplifier 226, which amplifies another portion of the output of the master oscillator laser source 202. An optical pump 228 provides the optical energy for this amplification. The low-power preamplifier 226 includes any suitable structure for amplifying optical signals, such as a fiber amplifier. The optical pump 228 includes any suitable structure for providing optical energy used for amplification, such as one or more laser pump diodes. Note that any suitable mechanism can be used to divide the output of the laser source 202 and to provide different portions of the output to the EO modulator 206 and the preamplifier 226.

A frequency shift modulator 230 receives the amplified output from the low-power preamplifier 226 and shifts the frequency of the amplified output. Frequency driver electronics 232 control the operation of the frequency shift modulator 230 to thereby control the frequency shift. For instance, the frequency driver electronics 232 could control when the frequency shift modulator 230 is operating and how the frequency shift modulator 230 shifts the amplified output of the preamplifier 226. The frequency shift modulator 230 includes any suitable structure for frequency shifting optical signals. The frequency driver electronics 232 include any suitable structure for controlling frequency shifting of optical signals.

An LO long pulse EO modulator 234 receives the output from the modulator 230 and modulates the output to create an optical signal containing long pulses. Any suitable electro-optical modulation could be used here to generate an output having pulses. The pulses here are referred to as "long" pulses since they are longer than the pulses generated in the optical signal 112. This is done because of the uncertainty associated with the pulses in the reflected optical signal 116, which can depend (among other things) on the Doppler velocity of the target 102. In some embodiments, for example, the pulses in the optical signal 112 could be about 0.5 ns to about 3.0 ns in duration, and the pulses created by the EO modulator 234 could be about 100 ns in duration. Pulse driver electronics 236 control the operation of the EO modulator 234 to thereby control the generation of the long pulses. The EO modulator 234 includes any suitable structure for modulating optical signals. The pulse driver electronics 236 include any suitable structure for controlling electro-optical modulation of optical signals.

The output of the EO modulator 234 represents the optical signal 120 that is provided to the mixer 122 in the LADAR system 100. The pulses in the optical signal 120 define LO "gate" periods that represent the time windows when reflected pulses are expected to return from a target 102. It is during these time windows that the LADAR system 100 could attempt to identify reflected pulses from the target 102.

Although FIG. 2 illustrates one example of a transmitter 106 in the LADAR system 100, various changes may be made to FIG. 2. For example, the functional divisions shown in FIG. 2 are for illustration only. Various components in FIG. 2 could be combined, further subdivided, rearranged, or omitted and additional components could be added according to particular needs. As a particular example, all of the various electronics shown in FIG. 2 could be combined into a single controller. Also, other approaches could be used to generate an optical signal 112 containing doublet pulses, and other approaches could be used to generate an optical signal 120 for processing reflected pulses.

Figure 3:
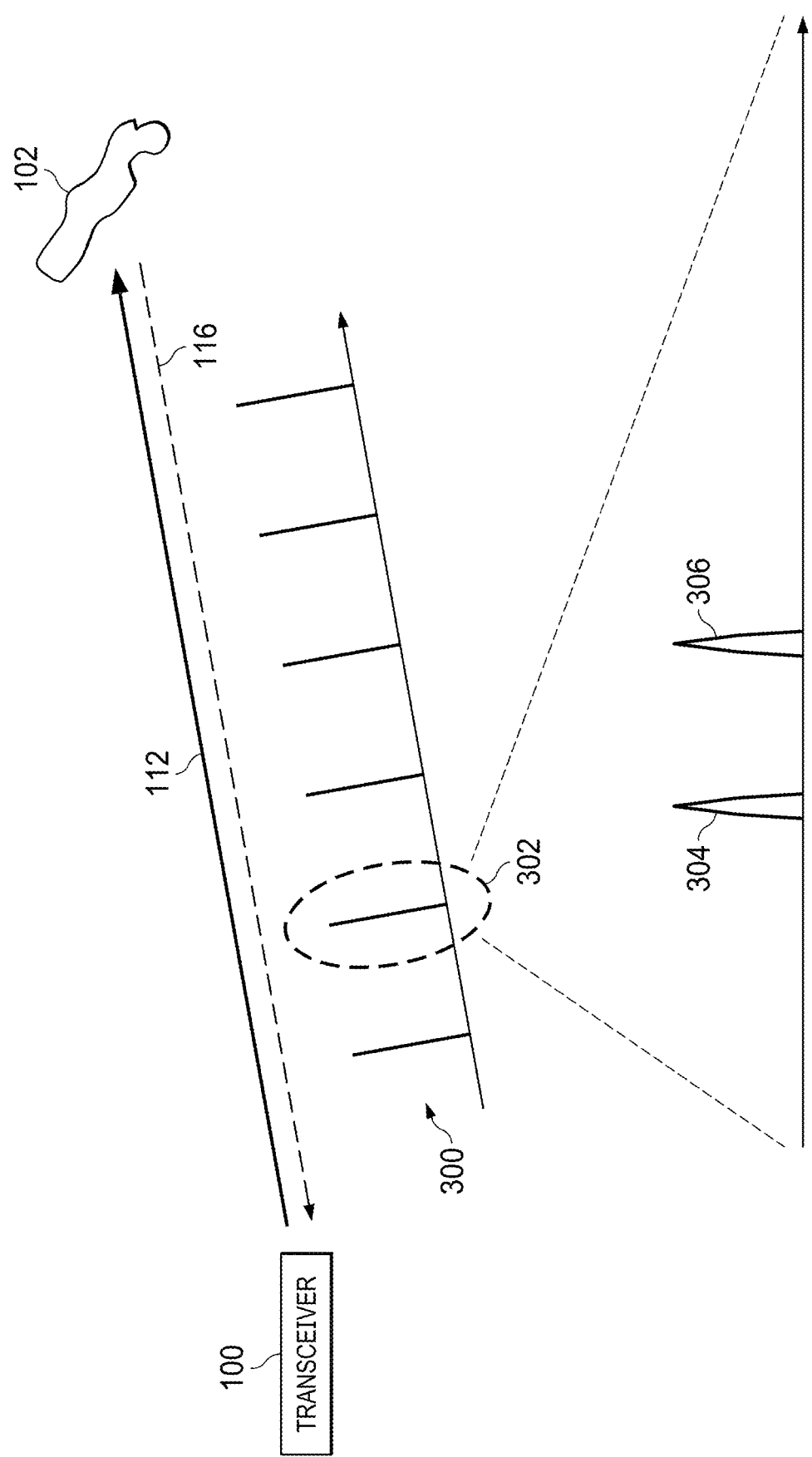
FIGS. 3 and 4 illustrate example waveforms for use in a LADAR system according to this disclosure.
Figure 4:
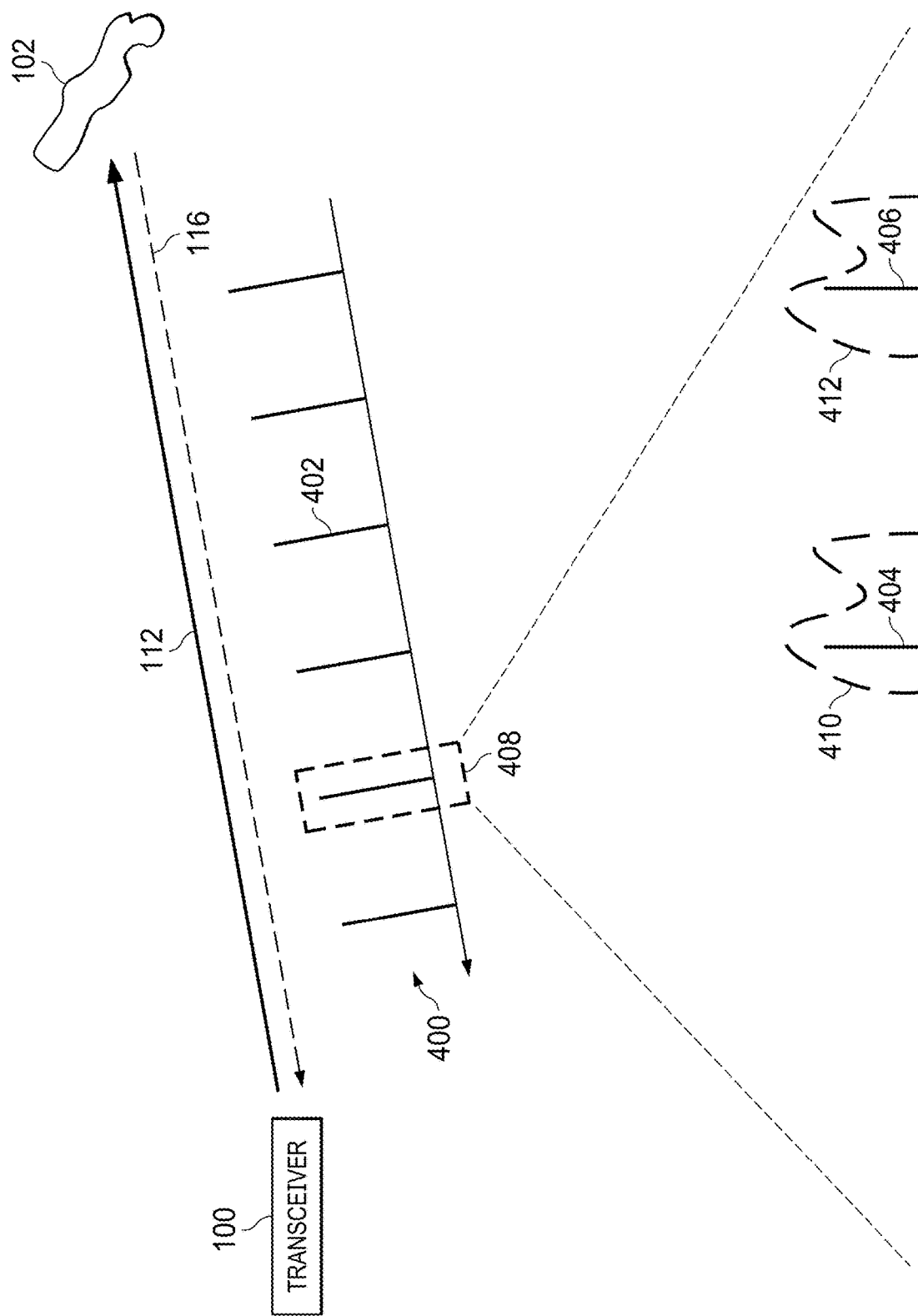

FIGS. 3 and 4 illustrate example waveforms for use in a LADAR system 100 according to this disclosure. In particular, FIG. 3 illustrates an example transmit waveform 300 in the optical signal 112, and FIG. 4 illustrates an example receive waveform 400 in the optical signal 116. For ease of explanation, the waveforms 300 and 400 in FIGS. 3 and 4 are described as being used in the LADAR system 100 of FIG. 1. However, the waveforms 300 and 400 could be supported by any other suitable LADAR system.

As shown in FIG. 3, the optical signal 112 is sent from a LADAR transceiver (the system 100) toward the target 102, and the optical signal 116 is reflected from the target 102 and received at the LADAR transceiver. The optical signal 112 includes a train of doublet pulses 302, where each doublet pulse 302 includes a first pulse 304 and a second pulse 306.

Each of the pulses 304 and 306 could have any suitable duration. In some embodiments, each pulse 304 and 306 has a width (denoted $\tau_p$) of approximately 0.5 ns to approximately 3.0 ns. The doublet pulses 302 can be separated by any suitable length of time, and the pulses 304-306 within each doublet pulse 302 can be separated by any suitable length of time. In some embodiments, the optical signal 112 could have a frequency of about 180 kHz to about 200 kHz, and adjacent doublet pulses 302 could be separated by a time (denoted $T_s$) of about 5 μs to about 5.55 μs. Also, in some embodiments, the pulses 304-306 in each doublet pulse 302 could be separated by a time (denoted $T_d$) of about 30 ns. Of course, other frequencies and timings could also be used.

The use of a train of coherent pulses can help to reduce the complexity of the LADAR system 100, such as when a GMAPD receiver is used to detect incoming reflected pulses. This is because the phases of subsequent pulses can ideally be predicted once the phrases of initial pulses are identified. However, one less desirable effect of using a repeating pattern is that it creates both range and Doppler ambiguities. Since $T_s$ is the pulse spacing between doublet pulses 302, the pulse repetition frequency (PRF) can be expressed as $1/T_s$. The range ambiguity is proportional to the pulse spacing, and the Doppler ambiguity is proportional to the pulse repetition frequency (and therefore inversely proportional to the pulse spacing). These inherent ambiguities combine with Doppler uncertainty caused by an unknown velocity of a target 102 and make it difficult to select a pulse repetition frequency that does not suffer from problems such as conjugate or negative frequency aliasing.

One way to combat issues such as aliasing involves quadrature processing. A pair of periodic signals is said to be in "quadrature" when the signals differ in phase by 90°. By combining a sine version of a signal with a cosine version of the same signal (which are 90° apart), the resulting combination represents the complex sum of the two versions, thereby converting the signal to a complex single-sided spectrum. The "in-phase" or reference signal is referred to as "I," and the signal that is shifted by 90° (the signal in quadrature) is called "Q." A simple way to obtain an I and Q optical heterodyned signal is to use two receivers, one with an LO reference signal and another with the same LO signal shifted by 90°. As noted above, however, providing two separate optical receivers greatly increases the size, weight, cost, and power of the LADAR system.

The waveform 300 shown in FIG. 3 allows the use of a single receiver by using the doublet pulses 302, where the pulses 304 and 306 are modulated using an alternating phase shift of 90°. In FIG. 4, the waveform 400 has a similar pattern as the waveform 300, which is expected since the waveform 400 is a reflected version of the waveform 300. In FIG. 4, the waveform 400 includes doublet pulses 402, each of which includes a first pulse 404 and a second pulse 406.

A window 408 can be defined around each doublet pulse 402 and represents the period of time during which receipt of the doublet pulse 402 is expected (based on all uncertainties and ambiguities). These windows 408 of time represent the LO gates defined by the pulses in the optical signal 120. In each of these windows 408, there are time periods 410 and 412 during which the pulses 404 and 406 are expected to be received. Photon counting can be performed in the time periods 410 and 412, and only the photon counts coincident with the actual locations of the pulses 404 and 406 could be used to perform coherent processing.

This approach allows a train of pulses in the received optical signal 116 to be separated into two signals by the signal processor 126, where the two signals are 90° out of phase with one another. The signal processor 126 can then use the two signals in standard I and Q processing techniques, such as by dividing the signals into range bins and performing spectral analysis on the bins to obtain the Doppler shift at specific ranges. The range-Doppler output from the waveform processing can be used to perform various functions, such as generating forward and inverse synthetic aperture imaging, range-resolved Doppler mapping, or range-resolved vibration imaging.

Although FIGS. 3 and 4 illustrate examples of waveforms 300 and 400 for use in a LADAR system 100, various changes may be made to FIGS. 3 and 4. For example, the doublet pulses and the pulse pairs could have any suitable spacings. Also, the received pulses can vary depending on movement of the target 102 or movement of the LADAR system 100.

Figure 5:
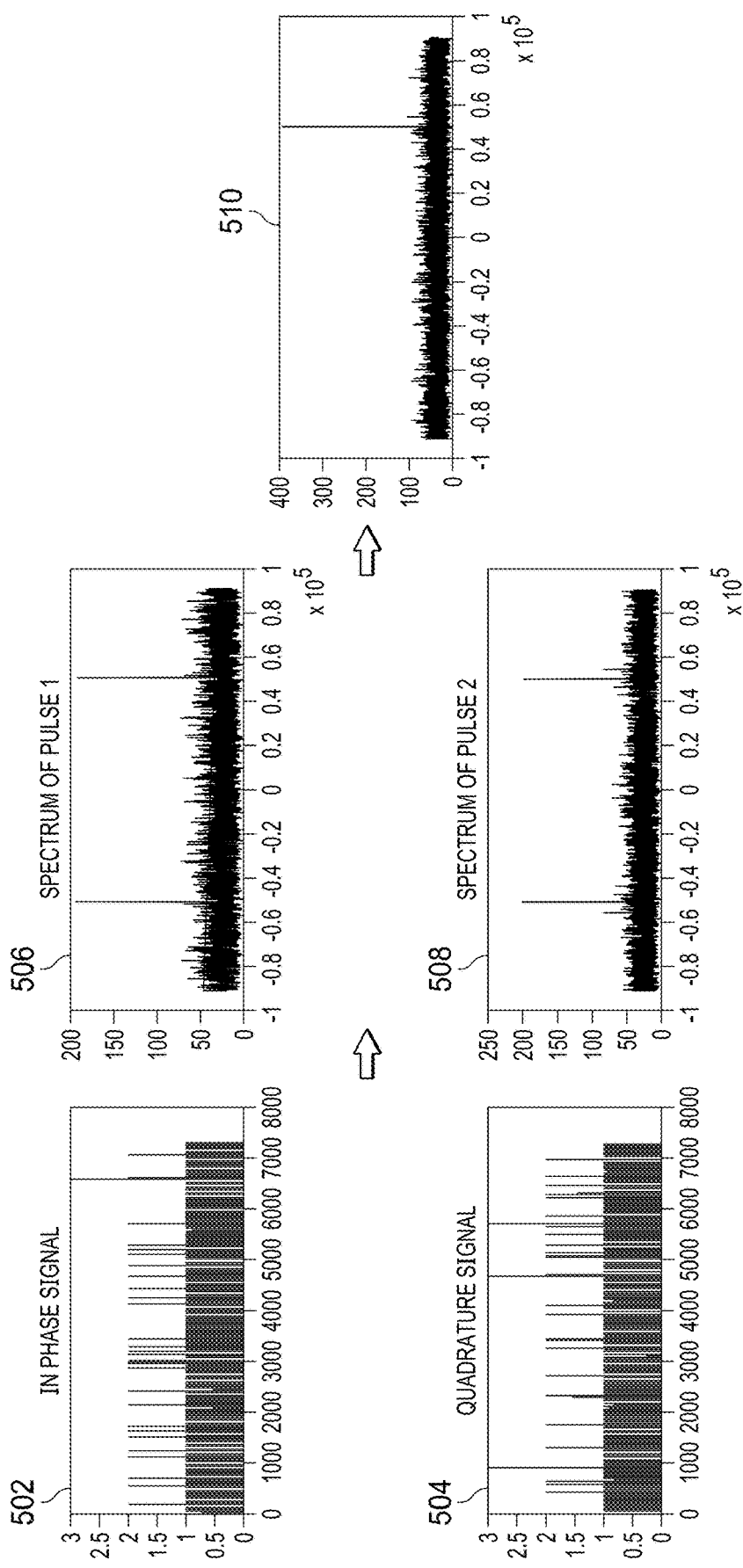
FIG. 5 illustrates example operations of a LADAR system according to this disclosure.

FIG. 5 illustrates example operations of a LADAR system 100 according to this disclosure. In particular, FIG. 5 illustrates an example collection of photon counts related to doublet pulses and the processing of that information. For ease of explanation, the operations shown in FIG. 5 are described as being performed by the LADAR system 100 of FIG. 1. However, the operations could occur in any other suitable LADAR system.

In FIG. 5, time series data 502 is shown for "I" pulses associated with a 50 kHz signal, and time series data 504 is shown for "Q" pulses associated with the 50 kHz signal. As noted above, the "I" and "Q" pulses denote different pulses that are phase shifted in doublet pairs. As a particular example, the data 502 can denote photon counting results for time windows associated with the pulses 404 in received doublet pulses 402, and the data 504 can denote photon counting results for time windows associated with the pulses 406 in the received doublet pulses 402 (or vice versa).

The time series data 502 is converted into a frequency spectrum 506, and the time series data 504 is converted into a frequency spectrum 508. This could be done by the signal processor 126 or other component in any suitable manner, such as by using a fast Fourier transform (FFT). As can be seen here, both the frequency spectrum 506 and the frequency spectrum 508 include spikes around ±50 kHz, which is expected given the 50 kHz signal. The frequency spectrum 506 represents frequency information for the "in-phase" pulses, and the frequency spectrum 508 represents frequency information for the "quadrature" pulses. Combining the frequency spectrum 506 and the frequency spectrum 508 yields a frequency spectrum 510, which contains a spike around 50 kHz but no spike around −50 kHz. Thus, the described approach can be used to obtain a desired single-sided spectrum, meaning that the conjugate or negative signal image (−50 kHz) has been cancelled.

Although FIG. 5 illustrates examples of operations of a LADAR system 100, various changes may be made to FIG. 5. For example, the data contained in the various plots of FIG. 5 are for illustration only and are merely meant to illustrate the types of operations that could be performed in the LADAR system 100.

Figure 6A:
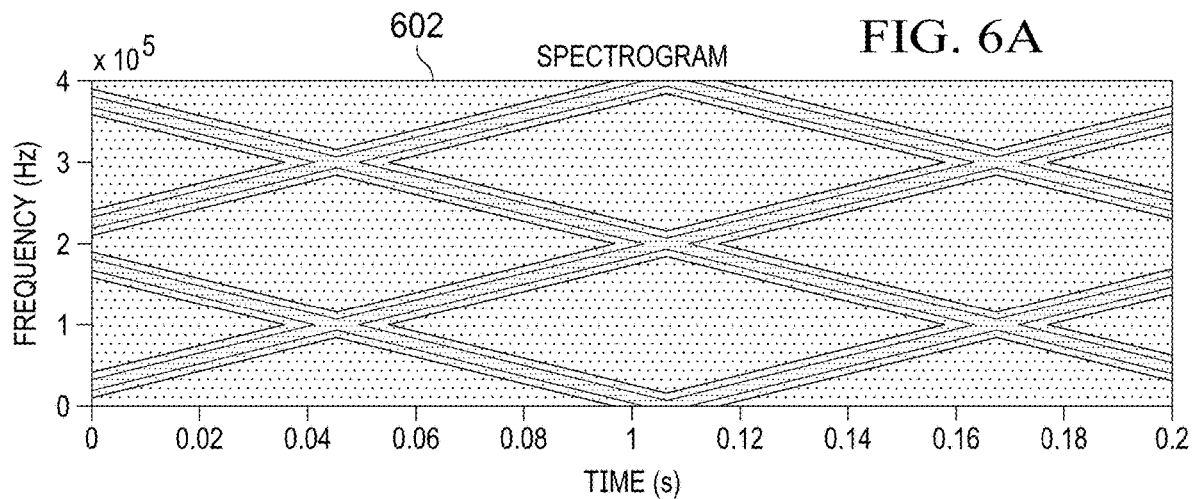
FIGS. 6A through 6C illustrate example results obtained using a LADAR system according to this disclosure.
Figure 6B:
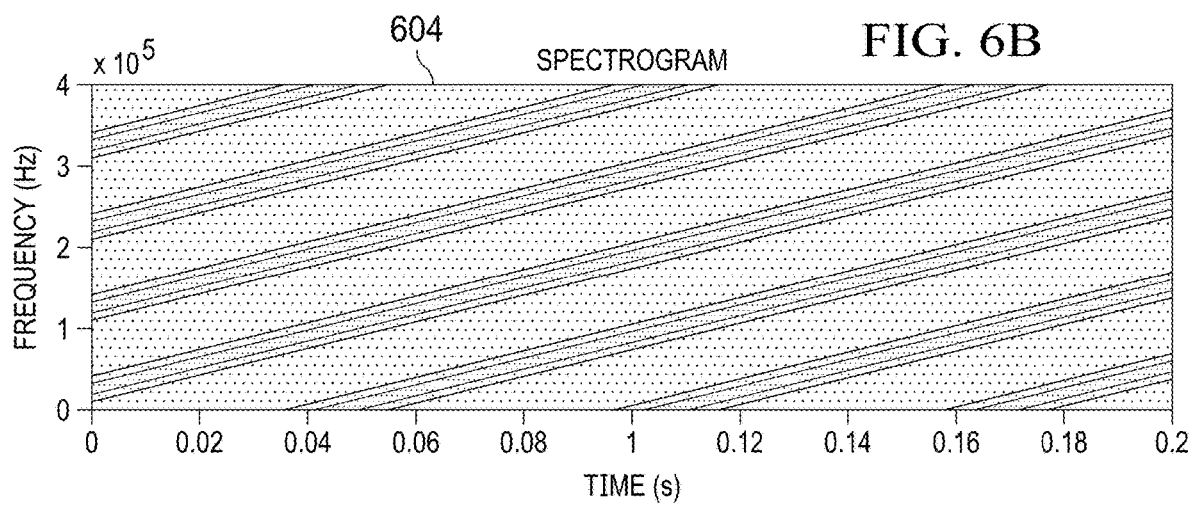
Figure 6C:
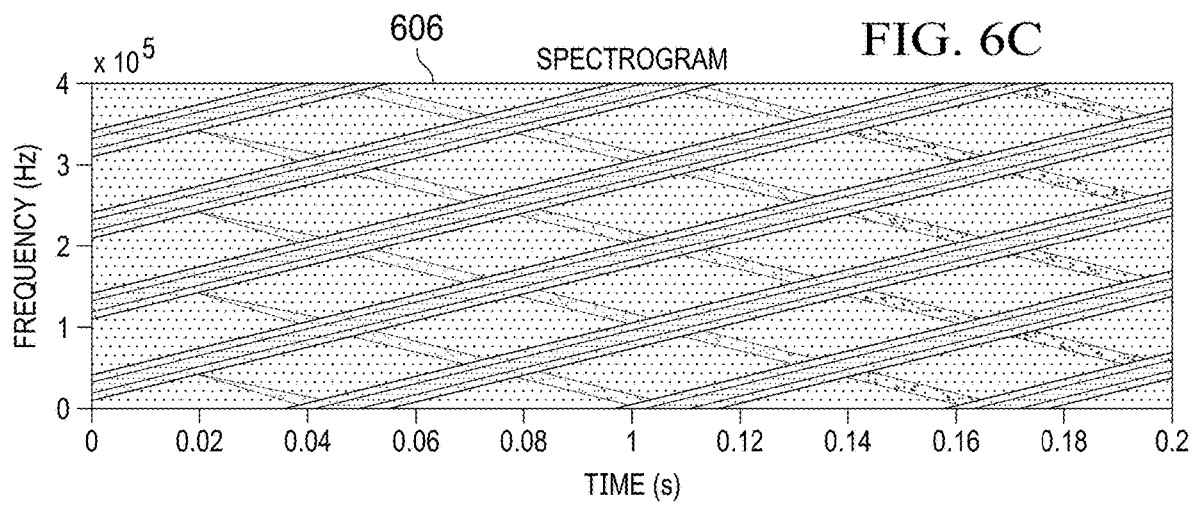

FIGS. 6A through 6C illustrate example results obtained using a LADAR system according to this disclosure. In particular, FIGS. 6A through 6C illustrate example spectrograms associated with different configurations of a LADAR system. For ease of explanation, some of the results shown in FIGS. 6A through 6C are described as being obtained by the LADAR system 100 of FIG. 1. However, these results could be obtained using any other suitable LADAR system.

In FIG. 6A, a spectrogram 602 is obtained when a train of pulses is sent at 200 kHz and no I and Q processing is used. In FIG. 6B, a spectrogram 604 is obtained when a train of pulses is sent at 100 kHz and pure I and Q processing is used (meaning simultaneous I and Q processing is done in parallel paths). In FIG. 6C, a spectrogram 606 is obtained when a train of doublet pulses is sent at 100 kHz and sequential I and Q processing is used.

The spectrogram 602 plots the spectrum as a function of time, and two signal traces (starting at 10 kHz and 210 kHz due to a 200 kHz Nyquist ambiguity) can be seen. The spectrogram 602 also includes two conjugate signals at 190 kHz and 390 kHz. As the signal is ramped in frequency as a function of time, the signal traces go up while the conjugate traces go down. This causes any signal path to intercept with a conjugate signal every 100 kHz, creating aliasing that corrupts the signal.

The spectrogram 604 plots the spectrum as a function of time, where I and Q processing of quadrature signals occurs simultaneously. In order to keep the energy constant with reference to the spectrogram 602, the pulse repetition frequency is reduced here by a factor of two. In the spectrogram 604, signal traces starting every 100 kHz are observed. All signal traces ramp up, but no conjugate trace collides with and causes aliasing corruption of those signal traces.

The spectrogram 606 plots the spectrum as a function of time, where I and Q processing occurs sequentially using doublet pulses. In each doublet pulse, the second pulse is shifted 90° from the first pulse. Because the doublets are not simultaneous, a single detector or set of detectors can receive both the I and Q signals, which are separated temporally. This can be possible if the range to the target 102 is approximately known. Thus, multiple collected frames at one range resolution can be combined with multiple frames of a delayed range (delayed by the doublet spacing).

Again, since the two pulses in each doublet pulse are not simultaneous, an accumulating phase error increases as the frequency of the signal increases. The spectrogram 606 shows the signal traces starting clean, but the phase error starts to become significant as the frequency increases, which allows conjugate traces to start appearing. In some embodiments, the frequency of the optical signal 112 could be selected so that the system 100 can tolerate up to approximately 0.5 radians of phase error while still extracting useful information from the return optical signal 116, due to the spacing between pulses in each doublet and the maximum frequency offset. However, other embodiments could tolerate other phase errors while still extracting useful information.

Although FIGS. 6A through 6C illustrate one example of results obtained using a LADAR system 100, various changes may be made to FIGS. 6A through 6C. For example, the data contained in the various plots of FIGS. 6A through 6C are for illustration only and are merely meant to illustrate the types of results that could be obtained by the LADAR system 100 using different waveforms.

Figure 7:
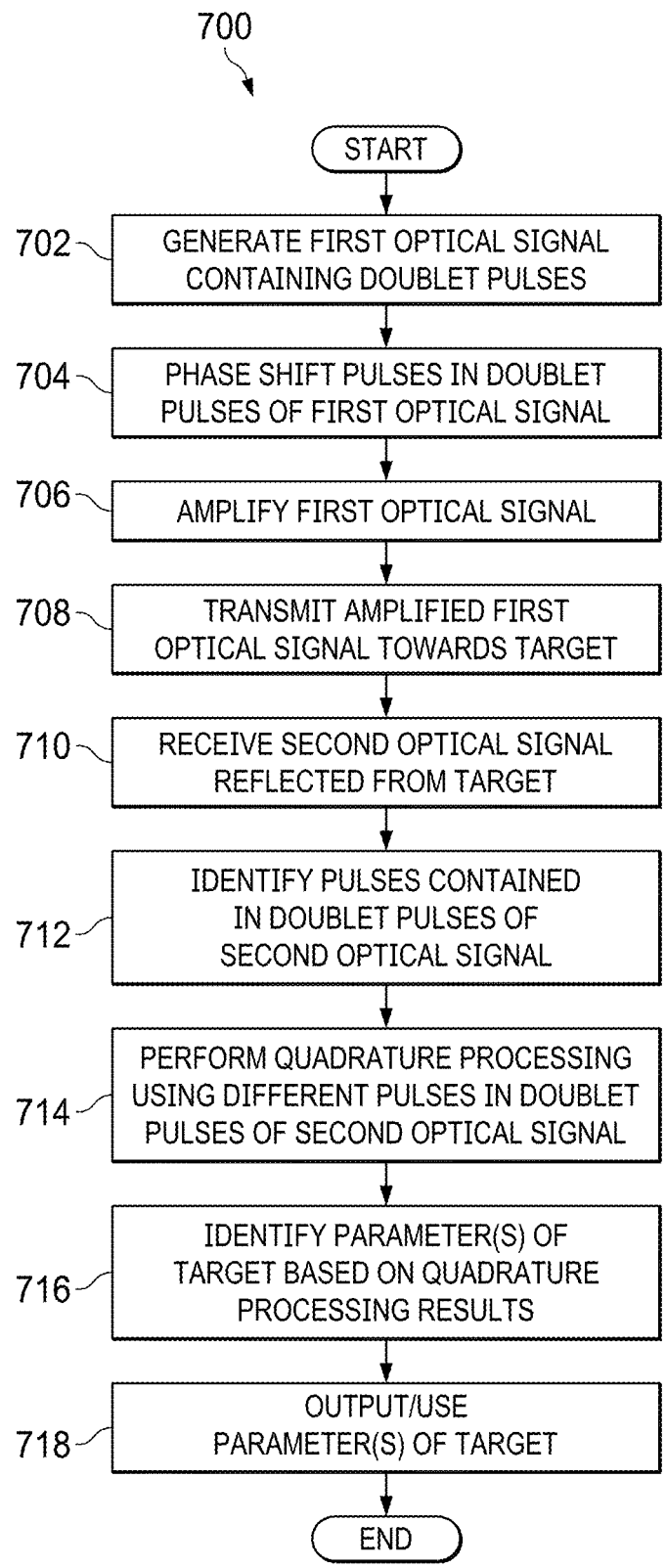
FIG. 7 illustrates an example method for operating a LADAR system according to this disclosure.

FIG. 7 illustrates an example method 700 for operating a LADAR system according to this disclosure. For ease of explanation, the method 700 of FIG. 7 is described as being performed using the LADAR system 100 of FIG. 1 with the transmitter 106 of FIG. 2. However, the method 700 could be used with any other suitable LADAR system and any other suitable transmitter.

As shown in FIG. 7, a first optical signal containing doublet pulses is generated at step 702. This could include, for example, the transmitter 106 of the LADAR system 100 generating an optical signal having the waveform 300 shown in FIG. 3. As a particular example, this could include the stabilized MO laser source 202 generating a continuous wave or other optical signal and the pulse shaping EO modulator 206 modulating the optical signal to create the doublet pulses.

Pulses in the doublet pulses of the first optical signal are phase shifted at step 704. This could include, for example, the transmitter 106 of the LADAR system 100 phase shifting one or both pulses in each doublet pulse output from the pulse shaping EO modulator 206 so that the pulses in each doublet pulse are phase shifted 90° from one another. As a particular example, this could include the phase modulator 210 shifting the second pulse in each doublet pulse 90° from the first pulse in each doublet pulse. One or both pulses in each doublet pulse could be phase shifted by any suitable amount as long as the pulses in each doublet are quadrature pulses.

The first optical signal is amplified at step 706, and the amplified first optical signal is transmitted towards at least one target at step 708. This could include, for example, the transmitter 106 of the LADAR system 100 amplifying the optical signal to create the optical signal 112 and providing the optical signal 112 to the telescope 110 via the transmit/receive optics 108 for transmission towards a target 102, with the optical signal 112 having the waveform 300 shown in FIG. 3. As a particular example, this could include the low-power preamplifier 214 amplifying the output from the phase modulator 210, the pulse gate EO modulator 218 reducing or removing ASE from the pre-amplified optical signal, and the high-power amplifier 222 amplifying the output from the pulse gate EO modulator 218.

A second optical signal that is reflected from the target is received at step 710. This could include, for example, the telescope 110 of the LADAR system 100 receiving an optical signal 116 having the waveform 400 shown in FIG. 4. Pulses contained in doublet pulses of the second optical signal are identified at step 712. This could include, for example, the detector electronics 124 of the LADAR system 100 performing photon counting to identify the pulses. As a particular example, this could include the mixer 122 mixing the optical signal 116 with an optical signal 120 containing longer pulses and the detector electronics 124 counting photons within different windows of time. This could also include the signal processor 126 analyzing the photon counting values from the detector electronics 124 to identify when pulses occur in the optical signal 116.

Quadrature processing is performed using different pulses in the doublet pulses of the second optical signal at step 714. This could include, for example, the signal processor 126 of the LADAR system 100 separating the pulses in the doublet pulses of the optical signal 116 into two signals, one signal shifted in phase by 90° from the other signal. This could also include the signal processor 126 processing the two signals, such as by performing a fast Fourier transform or other spectral analysis of the two signals. This could further include the signal processor 126 combining the spectra of the two signals to create a complex single-sided spectrum. In some embodiments, all or substantially all of the quadrature processing could occur via execution of software instructions.

One or more parameters of the target are identified based on results of the quadrature processing at step 716. This could include, for example, the signal processor 126 of the LADAR system 100 using the results to identify a range to the target 102 and a Doppler frequency of the target 102. Other information related to the target 102 could also or alternatively be generated based on the quadrature processing of the doublet pulses in the optical signal 116. The one or more parameters of the target can be output or used at step 718. This could include, for example, the signal processor 126 of the LADAR system 100 outputting the parameter(s) of the target 102 to a display 128 for presentation or to a storage device 130 for temporary or long-term storage. The parameters of the target 102 could also or alternatively be used in any other suitable manner.

Although FIG. 7 illustrates one example of a method 700 for operating a LADAR system, various changes may be made to FIG. 7. For example, while shown as a series of steps, various steps in FIG. 7 could overlap, occur in parallel, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating a first optical signal containing doublet pulses, each doublet pulse comprising a first pulse followed by a second pulse, the second pulses of the doublet pulses in quadrature with the first pulses of the doublet pulses, wherein a first time duration between an end of the first pulse and a start of the second pulse in each doublet pulse is shorter than a second time duration between an end of the second pulse in one doublet pulse and a start of the first pulse in a next doublet pulse;
transmitting the first optical signal towards a target;
receiving a second optical signal containing reflected doublet pulses from the target, each reflected doublet pulse comprising a first reflected pulse and a second reflected pulse;
separating the first and second reflected pulses into two signals;
performing spectral analyses of the two signals to generate two frequency spectra;
combining the two frequency spectra to create a complex single-sided spectrum of the second optical signal; and
identifying one or more parameters of the target based on the complex single-sided spectrum of the second optical signal, wherein the one or more parameters comprise at least one of a speed or a distance.

2. The method of claim 1, wherein generating the first optical signal comprises:
generating a continuous wave optical signal; and
modulating a first portion of the continuous wave optical signal to generate the doublet pulses.

3. The method of claim 2, further comprising:
frequency shift modulating a second portion of the continuous wave optical signal; and
generating a third optical signal based on the frequency shift modulated second portion of the continuous wave optical signal, the third optical signal comprising pulses that are longer than the first and second pulses of the doublet pulses.

4. The method of claim 3, further comprising:
mixing the second optical signal and the third optical signal; and
detecting the first and second reflected pulses using the mixed second and third optical signals.

5. The method of claim 1, wherein receiving the second optical signal comprises receiving the second optical signal using a single receiver.

6. The method of claim 1, wherein the at least one of the speed or the distance comprises a range to the target and a Doppler velocity of the target.

7. The method of claim 1, wherein the target comprises a ground or aerial vehicle.

8. The method of claim 1, further comprising:
after receiving the second optical signal containing the reflected doublet pulses from the target, performing photon counting to identify each reflected doublet pulse.

9. A system comprising:
a transmitter configured to generate a first optical signal containing doublet pulses and to transmit the first optical signal, each doublet pulse comprising a first pulse followed by a second pulse, the second pulses of the doublet pulses in quadrature with the first pulses of the doublet pulses, wherein a first time duration between an end of the first pulse and a start of the second pulse in each doublet pulse is shorter than a second time duration between an end of the second pulse in one doublet pulse and a start of the first pulse in a next doublet pulse; and
a receiver configured to (i) receive a second optical signal containing reflected doublet pulses from a target, each reflected doublet pulse comprising a first reflected pulse and a second reflected pulse, (ii) separate the first and second reflected pulses into two signals, (iii) perform spectral analyses of the two signals to generate two frequency spectra, (iv) combine the two frequency spectra to create a complex single-sided spectrum of the second optical signal, and (v) identify one or more parameters of the target based on the complex single-sided spectrum of the second optical signal, wherein the one or more parameters comprise at least one of a speed or a distance.

10. The system of claim 9, wherein:
the transmitter comprises a laser source and a first modulator;
the laser source is configured to generate a continuous wave optical signal; and
the first modulator is configured to modulate a first portion of the continuous wave optical signal to generate the doublet pulses.

11. The system of claim 10, wherein:
the transmitter further comprises a second modulator and a third modulator;
the second modulator is configured to frequency shift modulate a second portion of the continuous wave optical signal; and
the third modulator is configured to generate a third optical signal based on the frequency shift modulated second portion of the continuous wave optical signal, the third optical signal comprising pulses that are longer than the first and second pulses of the doublet pulses.

12. The system of claim 11, wherein:
the receiver comprises a mixer and a detector;
the mixer is configured to mix the second optical signal and the third optical signal; and
the detector is configured to detect the first and second reflected pulses using the mixed second and third optical signals.

13. The system of claim 9, further comprising:
a telescope configured to direct the first optical signal towards the target and to receive the second optical signal from the target; and
transmit/receive optics configured to direct the first optical signal from the transmitter to the telescope and to direct the second optical signal from the telescope to the receiver.

14. The system of claim 9, wherein the at least one of the speed or the distance comprises a range to the target and a Doppler velocity of the target.

15. A non-transitory computer readable medium containing instructions that when executed cause a signal processor to:

after a first optical signal containing doublet pulses is transmitted towards a target, identify reflected doublet pulses contained in a second optical signal received from the target, each doublet pulse comprising a first pulse followed by a second pulse, the second pulses of the doublet pulses in quadrature with the first pulses of the doublet pulses, each reflected doublet pulse comprising a first reflected pulse and a second reflected pulse, wherein a first time duration between an end of the first pulse and a start of the second pulse in each doublet pulse is shorter than a second time duration between an end of the second pulse in one doublet pulse and a start of the first pulse in a next doublet pulse;

separate the first and second reflected pulses into two signals;

perform spectral analyses of the two signals to generate two frequency spectra;

combine the two frequency spectra to create a complex single-sided spectrum of the second optical signal; and identify one or more parameters of the target based on the complex single-sided spectrum of the second optical signal, wherein the one or more parameters comprise at least one of a speed or a distance.

16. The system of claim 9, wherein the receiver is further configured, after receiving the second optical signal containing the reflected doublet pulses from the target, to perform photon counting to identify each reflected doublet pulse.

17. The non-transitory computer readable medium of claim 15, wherein the instructions that when executed cause the signal processor to separate the first and second reflected pulses into the two signals comprise:

instructions that when executed cause the signal processor to generate a first of the two signals using the first reflected pulses and generate a second of the two signals using the second reflected pulses, the two signals being substantially in quadrature.

18. The non-transitory computer readable medium of claim 15, wherein the instructions that when executed cause the signal processor to perform the spectral analyses comprise:

instructions that when executed cause the signal processor to perform a fast Fourier transform of each of the two signals.

19. The non-transitory computer readable medium of claim 15, wherein the instructions that when executed cause the signal processor to combine the two frequency spectra comprise:

instructions that when executed cause the signal processor to create the complex single-sided spectrum of the second optical signal, the complex single-sided spectrum lacking a conjugate or negative component associated with the second optical signal.

20. The non-transitory computer readable medium of claim 15, wherein the instructions that when executed cause the signal processor to identify the reflected doublet pulses comprise:

instructions that when executed cause the signal processor to perform photon counting to identify each reflected doublet pulse.

\* \* \* \* \*